May 30, 1967     C. BROOKS ET AL     3,322,610
REINFORCED PLASTIC STRIPPING AND METHOD FOR MAKING SAME
Filed July 23, 1962
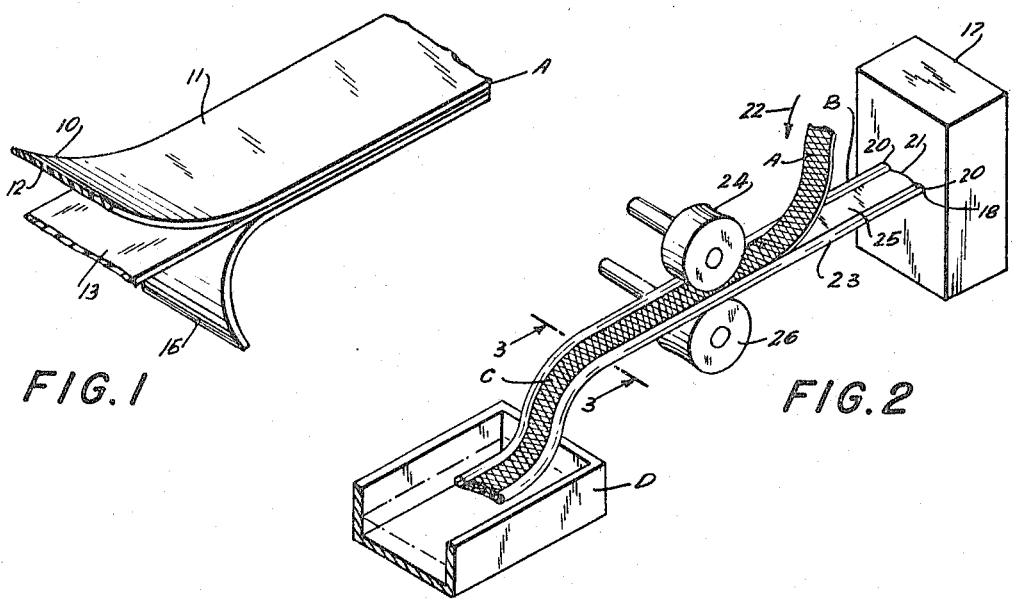
FIG.1
FIG.2
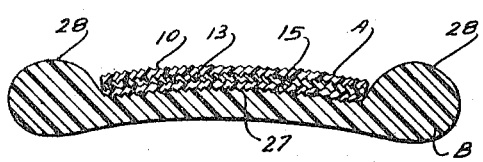
FIG.3
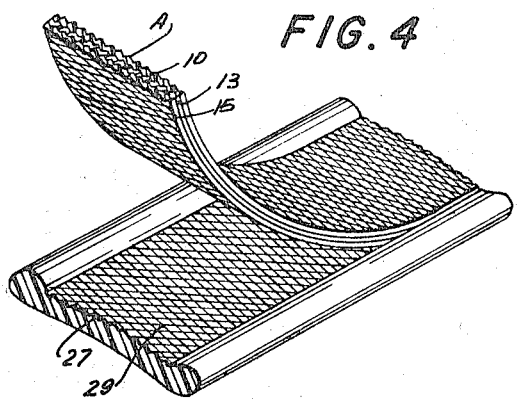
FIG.4
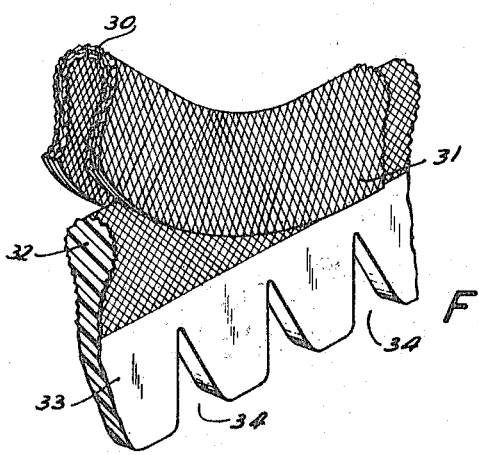
FIG.5
INVENTORS
CHARLES BROOKS
THOMAS K. SUTTON
BY
ATTORNEY United States Patent Office 3,322,610
Patented May 30, 1967

3,322,610
REINFORCED PLASTIC STRIPPING AND METHOD FOR MAKING SAME
Charles Brooks and Thomas A. Sutton, Forest Hills, N.Y., assignors to Cee-Bee Manufacturing Company, Inc., Brooklyn, N.Y., a corporation of New York
Filed July 23, 1962, Ser. No. 211,748
10 Claims. (Cl. 161—118)

The present application is a continuation-in-part of application Ser. No. 712,057, filed Jan. 20, 1958, now Patent No. 3,046,174, issued July 24, 1962; and also application Ser. No. 812,469, filed May 11, 1959, now Patent No. 3,024,147, issued Mar. 6, 1962.

The present invention relates to making strips of materials of polyolefins and particularly polyethylene and polypropylene.

In making strip materials of polyethylene and polypropylene, it has been found desirable to reinforce the same and at the same time not destroy the flexibility or pliability of the materials, and this cannot be readily accomplished by molding metallic wires or strips therein, because of the great differences in flexibility between metallic material and the polyolefin plastics and because of the difficulty of achieving desired adhesion or connection between the polyolefin material and the metallic or wire reinforcements.

It has now been found that it is possible to incorporate and obtain adhesion and combinations between reinforcing strip materials and polyethylene and polypropylene particularly when in heated extruded condition.

In making plastic strip materials particularly of polyethylene and polypropylene by rolling, casting or extrusion, it has been found that this method serves to reinforce or to strengthen without considerable difficulty and without losing the flexibility and pliability of the extruded polyethylene and polypropylene.

It is, therefore, among the objects of the present invention to provide a simple, inexpensive process of laminating or reinforcing polyethylene and polypropylene sheet materials or strip materials which will not increase the cost of production or detract from the flexibility or desirable properties of the plastic and which at the same time will enable the rapid production of maximum strength extruded or formed polyethylene and polypropylene strips of surprisingly attractive appearance and of high strength.

Another object of the present invention is to provide a polyethylene and polypropylene fabricating procedure in which the polypropylene and polyethylene will be readily reinforced incidental to the forming or extrusion of the plastic.

A further object of the present invention is to provide a novel laminated polyethylene and polypropylene plastic material and particularly one in which the plastic is laminated incidental to the extrusion or forming thereof without increasing cost and without decrease of the flexibility of the materials and without likelihood of separation after the lamination has been completed.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to laminate together a very thin layer of polyethylene terephthalate in relatively cool condition, a relatively thin layer of a polyolefin in a cool condition and a hot relatively thick layer of a polyolefin under substantial pressure.

The polyolefins may consist of linear or non-linear polyethylene or polypropylene or combinations of the same.

The laminated product may then be cooled by air cooling or water cooling.

Desirably the top which is the polyethylene terephthalate is undersurfaced adjacent the cool intermediate lamination of the polyolefin with a very thin layer of a vacuum evaporated metal, such as aluminum, and this is found to enhance the adhesion of the entire laminate so that there will be no opening, bending, flexing or other mechanical operations.

Desirably the pressure should be such during the lamination that it will result in a substantial integration of a thin layer of the polyolefin with the relatively thin layer of the polyolefin.

The heat of the thick layer of the polyolefin causes the lamination to take place immediately after extrusion, which extrusion temperature will be in the neighborhood of 400° to 500° F.

It has also been found that the polyolefin, particularly the hot thick polyolefin part of the laminate contains between 10 to 35% and desirably between 20 to 25% of a synthetic rubber polymer such as butadiene rubber.

Desirably all plasticizers should be eliminated.

The various sheets in the lamination may all have the same width although of different thicknesses.

The base material may be beaded up so as to extend over the edges of the thin lamination or the thin laminate may be caused to extend over the edge of the base hot extruded material to protect the edges thereof.

Although the polyethylene terephthalate may be corrugated or serrated into the thin and thick polyethylene or polypropylene under layers, it has usually been found most satisfactory to apply a straight flat pressure which will result in an expansion of the thin, and thick polyethylene materials.

The polypropylene or polyethylene appears to wet the metallized undersurface of the polyethylene terephthalate and to give greatly increased adhesion thereto.

With the foregoing and other objects in view, the invention consists of the novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a diagrammatic perspective view showing the laminated application film.

FIG. 2 is a diagrammatic perspective view showing the application of the laminated metalized structure of FIG. 1 to extruded polyethylene and polypropylene plastic.

FIG. 3 is a transverse sectional view on the line 3—3 of FIG. 2 showing the final preferred composite structure.

FIG. 4 is a fragmentary perspective view showing the laminated material lifted from its attachment to the extruded plastic strip to show the type of junction which is formed.

FIG. 5 is a fragmentary perspective view showing the laminated material as applied to a beaded strip.

Referring to FIG. 1, there is shown a laminate A having the top polyethylene terephthalate strip 10 which is usually in very thin sheet form about one-fourth to one mil. in thickness.

The under surface 12 of the top strip 10 is desirably metalized as by aluminum.

This metalizing is diagrammatically indicated by the interlayer 13 wihch is however actually integrally joined with the undersurface 12.

The top surface 11 is unprotected and the bottom face 12 may be metalized in a vacuum by a thin vacuum deposited coating of silver, gold, thin, aluminum, copper, cobalt or nickel or combinations of these or other metals.

This metalizing coat is of the order of several millionths of an inch.

This sheet of polyethylene terephthalate 10, which is metalized on its side 12, then may be corrugated, ridged or serrated as indicated in FIGS. 2 to 4, and is then combined with a hot extruded (400° to 500° F.) layer or strip 15 of polyethylene or polypropylene or a combination of both, and these laminations are then applied with substantial pressure to the extruded hot polyethylene or polypropylene B which may take various cross sections B but which as shown has upwardly projecting side beads 28 at its side edges 23 with the laminated material A being pressed into position on the face 25 as it moves in the direction 22 between the rollers 24 and 26.

The device 17 consists of an extrusion apparatus by which substantial pressure is applied to the molten polyethylene and polypropylene, and the extrusion slot 18 for the extruded material will have side beads 20 with a relatively thin intermediate portion 21.

If desired, the interior portion 21 of the slot 18 between the side beads 20 may be curved upwardly or may be flat.

The pressure rollers 24 and 26 will result in a substantial unitary combination inasmuch as the thin cool polyethylene or polypropylene sheet 15 and the heavy hot polyethylene or polypropylene extrusion B will be integrally combined together at the extrusion temperature.

The top strip 10 of polyethylene terephthalate will also be integrally united with the base B through the intermediate layer 15.

After this pressure uniting, the composite material A–B will be cooled either by air cooling or by water cooling to room temperature.

There is no need of applying a separate adhesive layer to the under face 12 of the top sheet 10 and although corrugation may be applied as indicated in FIGS. 2, 3 and 4, nevertheless such is not necessary to achieve adhesion.

In FIG. 3 is shown the base polyethylene and polypropylene material B with the laminated strip A pressed onto the convexly curved face 27 between the side beads 28.

The strip will be substantially permanently retained in position but to indicate that the corrugation extends into the base strip B, a portion of the cover strip A has been lifted showing the indentations at 29 on the convexly curved surface 27 where the pressure squeezes the elevations directly into the base film.

In the beaded material as indicated in FIG. 5, the laminate 30 which may be bent at 31 is forced onto the hot extruded (400° to 500° F.) cylindrical beading 32 having the integral attachment flange 33 with the cut-outs 34.

Here too in spite of the cylindrical shape and the necessity of bending the laminate almost three hundred sixty degrees, a substantially permanent union will be formed with the indentations which have been formed in the laminate being transmitted to the bead 32 by the pressure and resulting in a more permanent union.

The laminated material as indicated in FIGS. 1 and 5, may be applied as separate strips under pressure of rollers 24 and 26 to both sides of an extruded polyethylene and polypropylene strip although the application to one side as shown in FIG. 2 has been found to be sufficient.

The present invention may be widely used in connection with its application to boys', women's and men's beltings, trimmings for men's, boys' and ladies' hats, ladies' handbags, welting and various trims for shoes; furniture, furniture covers, seat covers, automotive trim both interior as well as exterior of the automotive body, moldings and weltings for edging, sealing or trimming various types of appliances such as electric refrigerators, kitchen cabinets, washing machines, air conditioning equipment, television and radio cabinets, and for wall moldings, edgings and strippings, as well as in various construction work.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

Having now particularly described and ascertained the nature of the invention, and in what manner the same is to be performed, what is claimed is:

1. A reinforced extruded shaped plastic polyethylene sheet material in hot extruded plastic softened condition at about 400 to 500° F. and substantially devoid of plasticizers and containing 10 to 35% of synthetic rubber polymer, having laminated on the hot extruded surface a thin plastic metallized sheet of polyethylene terephthalate.

2. A method of reinforcing polyethylene sheet material in hot extruded plastic softened condition at about 400 to 500° F. and substantially devoid of plasticizers and containing 10 to 35% of synthetic rubber polymer, which comprises applying on the hot polyethylene material a metallized plastic strip of polyethylene terephthalate and causing a junction by pressing the materials together while in hot plastic softened condition and uniting the material together by said pressure.

3. A process of laminating polyethylene plastic sheet materials in hot extruded plastic condition at about 400 to 500° F. and substantially devoid of plasticizers and containing 10 to 35% of synthetic rubber polymer to reinforce the same which comprises placing on the hot polyethylene material with heat and pressure a metallized thin plastic reinforcing strip of polyethylene terephthalate and uniting the material together by said pressure.

4. A process of reinforcing and laminating extruded polyethylene strip materials in hot extruded plastic softened condition at about 400 to 500° F. and substantially devoid of plasticizers and containing 10 to 35% of synthetic rubber polymer, which comprises applying on the hot polyethylene material in hot plastic softened condition a metallized strip of polyethylene terephthalate and then quickly uniting and then cooling the material together under pressure.

5. A process of laminating thin sections of polyethylene which comprises including in the material of the section 10 to 35% of a synthetic rubber polymer, said section being substantially devoid of plasticizers, extruding at a temperature of 400 to 500° F., pressing onto the section a thin layer of polyethylene terephthalate while the section is in hot extruded plastic softened condition, said layer having an under metallized surface to assure wetting by the extruded section of the thin layer, and uniting by pressing together and then quickly chilling.

6. The proces of claim 5, said thin layer being much cooler and thinner than the hot extruded section.

7. The process of claim 5, said synthetic rubber polymer consisting of butadiene polymer.

8. The process of claim 5, said thin layer being corrugated into the section by the pressure applied.

9. The process of claim 5 in which sufficient pressure is applied to cause expansion of the thin section.

10. The process of claim 5 in which the chilling is achieved by immersion in cold water.

References Cited
UNITED STATES PATENTS

| | | | |
|---|---|---|---|
| 2,569,540 | 10/1951 | Selby | 260—27 |
| 2,919,059 | 12/1959 | Sporka | 229—3.5 |
| 3,024,147 | 3/1962 | Brooks et al. | 156—244 |
| 3,046,174 | 7/1962 | Brooks et al. | 154—52.1 |

EARL M. BERGERT, *Primary Examiner.*

H. F. EPSTEIN, *Assistant Examiner.*